(12) United States Patent
Tang et al.

(10) Patent No.: US 12,535,980 B2
(45) Date of Patent: Jan. 27, 2026

(54) STRADDLE-TYPE VEHICLE

(71) Applicant: Zhejiang CFMOTO Power Co., Ltd., Zhejiang (CN)

(72) Inventors: Yazhou Tang, Hangzhou (CN); Xiaoang Qin, Hangzhou (CN); Yupeng Shen, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 0 days.

(21) Appl. No.: 18/741,616

(22) Filed: Jun. 12, 2024

(65) Prior Publication Data

US 2024/0329906 A1    Oct. 3, 2024

Related U.S. Application Data

(63) Continuation of application No. PCT/CN2022/137306, filed on Dec. 7, 2022.

(30) Foreign Application Priority Data

Jan. 21, 2022 (CN) .......... 202210069981.X
Aug. 25, 2022 (CN) .......... 202211045151.X
Oct. 31, 2022 (CN) .......... 202211360075.1

(51) Int. Cl.
*G06F 3/14* (2006.01)
*B62H 5/20* (2006.01)
(Continued)

(52) U.S. Cl.
CPC .............. *G06F 3/14* (2013.01); *B62H 5/20* (2013.01); *B62J 50/22* (2020.02); *G06F 8/65* (2013.01); *G07C 5/008* (2013.01); *H04L 67/12* (2013.01)

(58) Field of Classification Search
CPC .... G06F 3/14; G06F 8/65; B62J 50/22; B62H 5/20; G07C 5/008; H04L 67/12
See application file for complete search history.

(56) References Cited

U.S. PATENT DOCUMENTS 6,249,744 B1   6/2001  Morita
10,812,645 B2  10/2020 Montez et al.
(Continued)

FOREIGN PATENT DOCUMENTS

CN    104950721 A    9/2015
CN    105516371 A    4/2016
(Continued)

*Primary Examiner* — Kenneth B Lee, Jr.
(74) *Attorney, Agent, or Firm* — Shewchuk IP Services, LLC; Jeffrey D. Shewchuk

(57) ABSTRACT

A straddle-type vehicle includes a vehicle body, a suspension system, a set of wheels, a power system, a steering assembly, a vehicle-mounted transmission terminal, at least one acquisition module, and a local area network (LAN) cable. The vehicle-mounted transmission terminal is capable of transmitting signals to a user's portable communications/display device. The vehicle-mounted transmission terminal is connected to at least one acquisition module by the LAN cable. The acquisition module acquires driving data of the straddle-type vehicle. During the running of the straddle-type vehicle, the vehicle-mounted transmission terminal transmits the acquired driving data to the user's portable communications/display device, and the driving data is converted into one or a plurality of instrument images for display on a screen of the user's portable communications/display device. The straddle-type vehicle has better user driving experience and reduced cost of centralized control display screen.

19 Claims, 7 Drawing Sheets

(51) Int. Cl.
*B62J 50/22* (2020.01)
*G06F 8/65* (2018.01)
*G07C 5/00* (2006.01)
*H04L 67/12* (2022.01)

(56) References Cited

U.S. PATENT DOCUMENTS

| | | | |
|---|---|---|---|
| 2014/0129052 A1* | 5/2014 | Gau | B62H 5/20 |
| | | | 701/2 |
| 2015/0186094 A1* | 7/2015 | Ricci | G06F 13/14 |
| | | | 701/36 |
| 2020/0130771 A1 | 4/2020 | Jacobsz Rosier et al. | |
| 2021/0065224 A1* | 3/2021 | Kawashima | B60W 40/12 |
| 2022/0227444 A1* | 7/2022 | Di Tanna | B62J 6/24 |
| 2022/0276855 A1 | 9/2022 | Peng et al. | |
| 2023/0236822 A1 | 7/2023 | Liu et al. | |

FOREIGN PATENT DOCUMENTS

| | | |
|---|---|---|
| CN | 206475817 U | 9/2017 |
| WO | 2018223234 A1 | 12/2018 |

* cited by examiner

STRADDLE-TYPE VEHICLE

RELATED APPLICATION INFORMATION

The present application is a continuation of PCT/CN2022/137306 entitled "Saddle-Type Vehicle" filed Dec. 7, 2022, and claims the benefits of priority to Chinese Patent Applications No. 202210069981.X, entitled "Vehicle and Vehicle Assisted Driving Method", filed with the Chinese Patent Office on Jan. 21, 2022; No. 202211045151.X, entitled "Saddle-type Vehicle", filed with the Chinese Patent Office on Aug. 25, 2022; and No. 202211360075.1, entitled "Vehicle", filed with the Chinese Patent Office on Oct. 31, 2022. The entire contents of the above-referenced applications are incorporated herein by reference.

FIELD OF THE DISCLOSURE

The present application relates to the field of vehicles, and particularly to a straddle-type vehicle.

BACKGROUND OF THE DISCLOSURE

Motorcycles are two or three wheeled vehicles that allow control the steering of the front wheel by hand, with one or two saddle-shaped seats for users to ride on. Motorcycles have advantages of being light-weight, being convenient, and driving quickly, and are widely used for personal transport, passenger and light freight transportation, and also used as sports equipment. Motorcycles can be divided into street bikes, road racing motorcycles, off-road motorcycles, cruisers, and the like.

Some motorcycles are provided with a centralized control screen for displaying vehicle information. In order to enhance the driving experience of motorcycle users and increase their visual experience, such centralized control screens have evolved from displaying vehicle condition data to being able to achieve more functions, including vehicle navigation, multimedia functions, and the like. With the increasing variety of functions that can be processed and displayed on the centralized control screen, hardware and software needs of the vehicle are constantly increased to achieve the above functions, thereby leading to a continuous increase in the cost of motorcycles.

SUMMARY OF THE INVENTION

In order to address one or all of the above issues, the present application provides a straddle-type vehicle with improved driving experience and reduced cost of the centralized control screen configuration.

To achieve the above objectives, the present application provides a straddle-type vehicle. The straddle-type vehicle includes a vehicle body, a suspension system, a set of wheels, a power system, a steering assembly, a vehicle-mounted transmission terminal, an acquisition module, and a LAN cable. The suspension system is connected to the vehicle body. The set of wheels is connected to the vehicle body by the suspension system. The power system is connected to drive at least one of the wheels in a transmission mode. The steering assembly is used to control the driving direction of the straddle-type vehicle, and the steering assembly is connected to at least one of the wheels by the suspension system, the steering assembly including a steering handlebar. The vehicle body includes a front frame portion and a rear frame portion with a saddle area for a user to ride defined between the front frame portion and the rear frame portion. The set of wheels includes a front wheel connected to the front frame portion by the suspension system and a rear wheel connected to the rear frame portion by the suspension system. A first portable communications/display device of a vehicle user is detachably mounted on the front frame portion, and the vehicle-mounted transmission terminal is capable of transmitting and receiving signals to communicate with the user's portable communications/display device. The vehicle-mounted transmission terminal is connected to the acquisition module by the LAN cable, and the acquisition module is capable of acquiring driving data of the straddle-type vehicle. When the straddle-type vehicle is running, the vehicle-mounted transmission terminal is capable of transmitting the acquired driving data to the user's portable communications/display device, and the user's portable communications/display device is capable of converting the driving data into instrument images for display on the screen of the user's portable communications/display device.

The user's portable communications/display device serves as an instrument for displaying instrument images on the straddle-type vehicle, thereby reducing the hardware and software requirements of the straddle-type vehicle and improving the user driving experience while allowing cost reduction of the straddle-type vehicle.

DETAILED DESCRIPTION

For a better understanding of the purpose, technical solutions and advantages of the present invention, preferred embodiments of the present invention are described and illustrated below. These only represent several embodiments of the present invention, and the descriptions thereof are relatively specific and detailed, but should not be construed as a limitation to the scope. It should be noted that for those skilled in the art, without departing from the concept of the present invention, several modifications and improvements may be made, which all belong to the scope of the present invention. Therefore, the scope of the present invention should be determined by the appended claims.

Unless otherwise defined, the technical or scientific terms used in this specification shall have the general meaning understood by a person with ordinary skill in the technical field to which this invention belongs. As used in this specification, the terms "a", "an", "the", "these", and the like do not denote quantitative limitations, and they may be singular or plural. As used in this specification, the terms "comprising", "including", "having" and any variations thereof are intended to cover non-exclusive inclusion.

Figure 1:
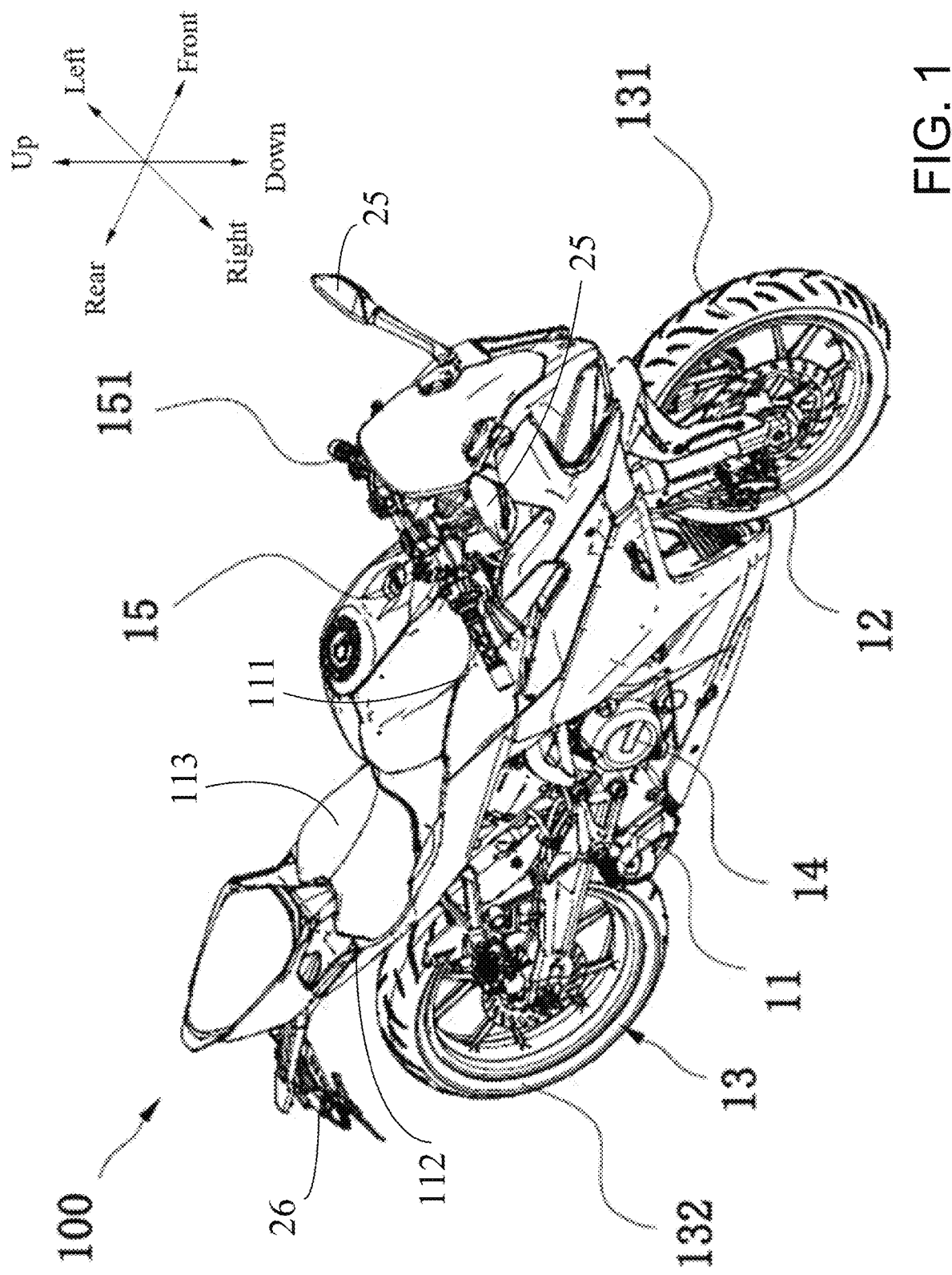
FIG. 1 is a front right perspective view of a straddle-type vehicle in an embodiment of the present invention.
Figure 2:
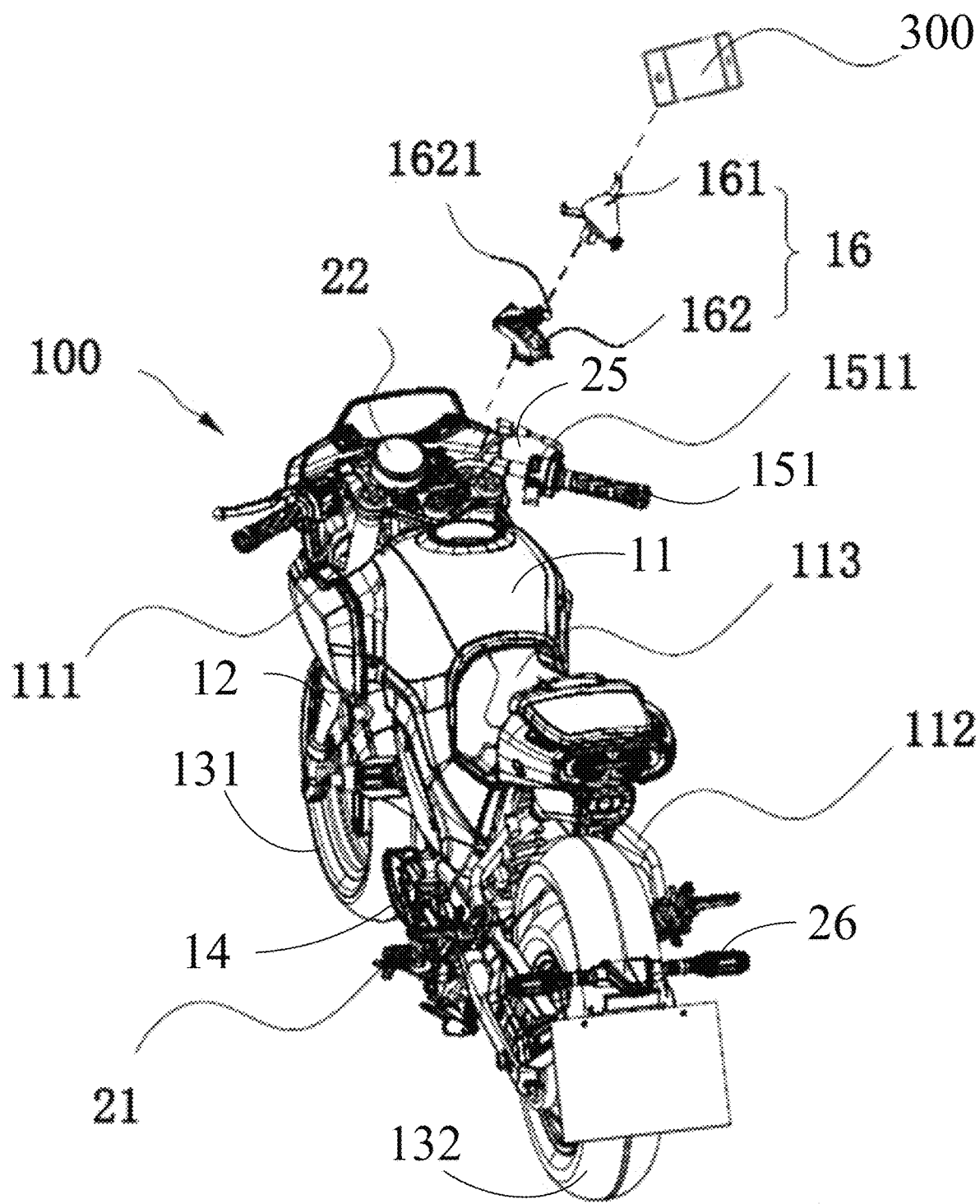
FIG. 2 is a rear left perspective view of the straddle-type vehicle of FIG. 1.

As shown in FIGS. 1 and 2, a straddle-type vehicle 100 includes a vehicle body 11, a suspension system 12, a set of wheels 13, a power system 14, and a steering assembly 15. The vehicle body 11 includes a front frame portion 111 and a rear frame portion 112, with a saddle area 113 for a user to straddle and ride on defined between the front frame portion 111 and the rear frame portion 112. The suspension system 12 is connected to vehicle body 11. The set of wheels 13 preferably includes a front wheel 131 and a rear wheel 132, such that the straddle-type vehicle 100 is preferably a motorcycle. The front wheel 131 is connected to the front frame portion 111 of the vehicle body 11 by the suspension system 12, and the rear wheel 132 is connected to the rear frame portion 112 by the suspension system 12. The power system 14 is at least partially mounted on the vehicle body 11 and is connected to provide torque to at least one of the front wheel 131 and the rear wheel 132 in a transmission mode. The steering assembly 15 is connected to the front wheel 131 by the suspension system 12, thereby controlling the driving direction of the motorcycle 100. The steering assembly 15 preferably includes a steering handlebar 151. The general orientations of front, rear, up and down for the motorcycle 100 are shown in FIG. 1, and left and right are defined as riding on the vehicle 100 looking forward.

As shown in FIG. 2, a first portable communications/display device 300 of a user of the motorcycle 100 is detachably mounted on the vehicle body 11. For instance, the first portable communications/display device of the user may be a smartphone 300. Alternatively, the first portable communications/display device could be a tablet computer, mobile terminal or similar computing device having both communications capabilities, the ability to be programmed with software, and display capabilities, as well as at least some input mechanism such as one or more buttons or dials, a mouse, a trackball or a touch-sensitive screen. The motorcycle 100 includes an anti-vibration bracket 16, which is at least partially arranged on the vehicle body 11 and is positioned above the front frame portion 111 of the vehicle body 11. The smartphone 300 may be detachably mounted on the motorcycle 100 using the anti-vibration bracket 16.

Furthermore, the anti-vibration bracket 16 is provided with a shock-absorbing component (not separately shown) so as to achieve the anti-vibration effect of the smartphone 300 during running. The shock-absorbing component of the anti-vibration bracket 16 may be an elastic component, for example, a spring or rubber component or an air damper. The vibration amplitude of the smartphone 300 is reduced by the shock-absorbing component, which makes it easier for the user to view the image information displayed on the display screen of the smartphone 300 during running of the vehicle 100, as well as improving the accuracy of user touch operations on the smartphone 300.

The anti-vibration bracket 16 includes a mounting member 161 and a fixing member 162. The mounting member 161 is used to secure or mount the smartphone 300. The connection method between the mounting member 161 and the smartphone 300 may be by a snap fit, by movable brackets, by magnetic interaction, by friction, by suction, or by a combination thereof. One end of the fixing member 162 is connected to the vehicle body 11, and the other end of the fixing member 162 is preferably provided with a rotating portion 1621. The mounting member 161 is rotatably connected to the fixing member 162 by the rotating portion 1621. By virtue of the rotating portion 1621, when the smartphone 300 is connected to the anti-vibration bracket 16, the smartphone 300 can be switched between a horizontal arrangement or a vertical arrangement by hand rotation, so as to meet the preferences of users in different driving environments.

The motorcycle 100 is capable of transmitting signals to the smartphone 300 such as by a wireless communications protocol. When the motorcycle 100 is running, the motorcycle 100 is capable of transmitting driving data to the smartphone 300, and the smartphone 300 can convert the driving data into instrument images for display on the screen of the smartphone 300. Compared to the display screens commonly used on existing motorcycles, most user smartphones have more powerful image processing and display functions. The preferred motorcycle 100 preferably has a basic display screen 22 which is separate from the smartphone 300, so the motorcycle 100 can still be driven even without the smartphone 300. However, the preferred motorcycle 100 optimizes the display effect of the instrument images by directing certain instrument images that cannot be adequately shown on the basic display screen 22 to the smartphone 300. The present invention thereby enriches the user experience while reducing the hardware and software requirements of the basic display screen 22 thereby reducing the cost of the motorcycle 100.

The driving data transmitted to the smartphone 300 includes vehicle information and vehicle control information. The vehicle information is selected from at least one of the group consisting of: current vehicle velocity, current vehicle gear, current vehicle temperature, and remaining fuel volume or remaining battery charge. The vehicle information may further include driving mode and total mileage. The preferred power system 14 of the motorcycle 100 is an internal combustion engine, in which case the current vehicle temperature shown on the smartphone 300 is mainly the sensed engine temperature of the motorcycle 100. The preferred embodiment further transmits additional vehicle information to the smartphone 300 to display such as remaining oil volume and engine rotational speed. Alternatively, the power system 14 of the motorcycle 100 may be a battery powered electric motor, in which case the current vehicle temperature shown on the smartphone 300 mainly includes a sensed battery temperature, a sensed motor temperature, and a sensed motor controller temperature of the motorcycle 100. Additional vehicle information transmitted to the smartphone 300 for display may include motor rotational speed.

The vehicle control information can be generated based on the touch operation of the motorcycle 100. The touch operation is selected from at least one of the group consisting of press operation, rotating operation, toggle operation, and stepping operation.

Figure 3:
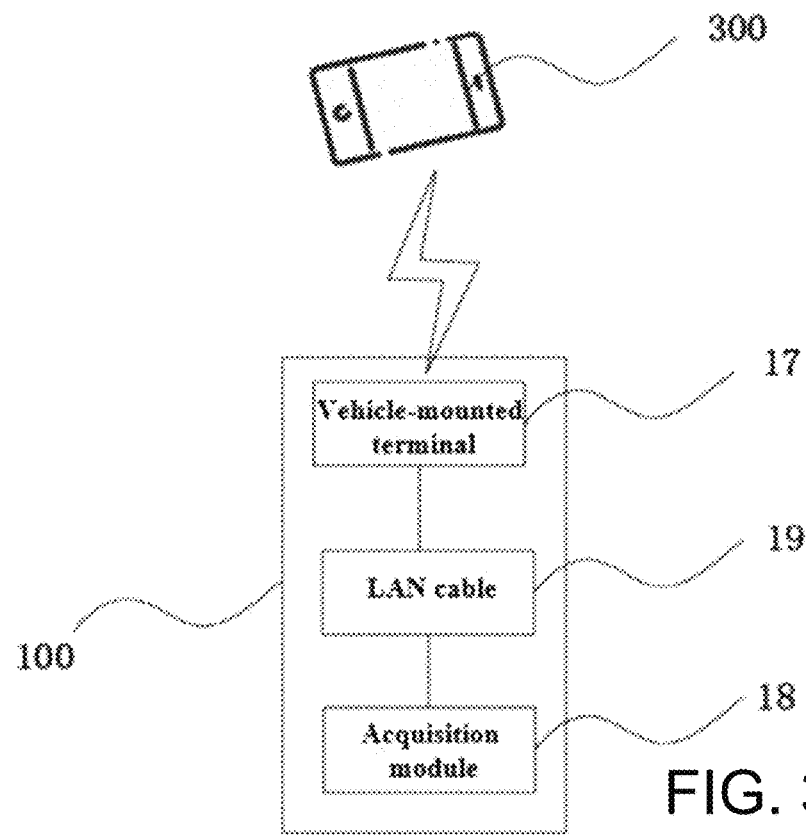
FIG. 3 is a block diagram of the vehicle-mounted transmission terminal used in the straddle-type vehicle of FIGS. 1 and 2 communicating with the user's portable communications/display device.

As shown in FIG. 3, the preferred motorcycle 100 includes a vehicle-mounted transmission terminal 17, which can be mounted anywhere on the vehicle body 11. The motorcycle 100 is capable of transmitting signals to the smartphone 300 by the vehicle-mounted transmission terminal 17. For instance, the signals transmitted to the smartphone 300 by the vehicle-mounted transmission terminal 17 may represent driving data of the motorcycle 100.

The preferred embodiment includes at least one acquisition module 18 arranged on the motorcycle 100, and the at least one acquisition module 18 is used to acquire driving data of the motorcycle 100. The acquisition module 18 is preferably selected from one or more of the group consisting of: a Vehicle Control Unit (VCU), a Body Control Module (BCM), Electrical Power Steering (EPS), a Steering Angle Sensor (SAS), an Electronic Parking Brake (EPB), an Electronic Stability Program (ESP), a Hybrid Control Unit (HCU), and a Transmission Control Unit (TCU).

The driving data is processed in the smartphone 300, and the processing results are preferably displayed as instrument images on the display of the smartphone 300, so the user of the motorcycle 100 can timely understand the vehicle condition information. In the event of a fault in the motorcycle 100, the user can immediately see vehicle condition information representing the fault, and the user can promptly address and eliminate the cause of the fault, thereby reducing the maintenance cost of the motorcycle 100.

The motorcycle 100 includes a local area network (LAN) cable 19 running at least between the acquisition module 18 and the vehicle-mounted transmission terminal 17. The LAN cable 19 is preferably selected from at least one of the group consisting of: CAN bus, LIN bus, Flex Ray bus, MOST-bus, or in-vehicle Ethernet bus. The LAN cable 19 carries driving data from the acquisition module 18 to the vehicle-mounted transmission terminal 17 for transmitting the acquired driving data to the smartphone 300.

As shown in FIG. 2, in one embodiment, the handlebar 151 is provided with a hand control part 1511. The hand control part 1511 is selected from at least one of the group consisting of: a button, a knob, and a toggle key. The hand control part 1511 is electrically connected to the vehicle-mounted transmission terminal 17. When the hand control part 1511 outputs a control command, the vehicle-mounted transmission terminal 17 is capable of transmitting the control command to the smartphone 300 to control smartphone 300 to perform corresponding display changes in response to the control command.

In terms of functionality, the hand control part 1511 is selected from at least one of the group consisting of: an illumination button, a steering button, and a light selection button. The control command is sent to the smartphone 300 by triggering the hand control part 1511, and the smartphone 300 displays the corresponding vehicle control information on its screen in response to the control command.

As shown in FIG. 2, the motorcycle 100 preferably further includes a control pedal 21. The vehicle control information may be alternatively or additionally generated based on a stepping operation on the control pedal 21. The control pedal 21 is arranged in the foot area of motorcycle 100, and the user can step on the front and rear ends of control pedal 21 with different stepping forces to generate different control commands.

Figure 4:
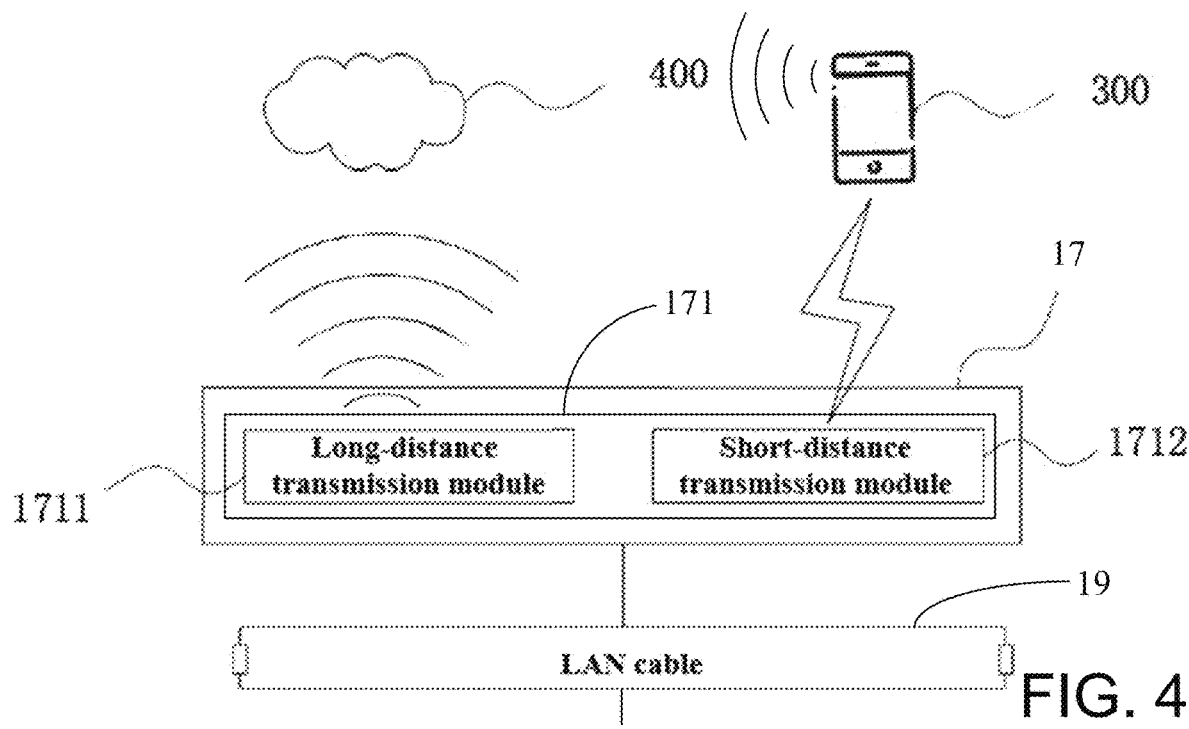
FIG. 4 is a block diagram providing details of a preferred vehicle-mounted transmission terminal used in the straddle-type vehicle of FIGS. 1 and 2, showing communication links both with the user's portable communications/display device and with the cloud platform.

As shown in FIG. 4, the vehicle-mounted transmission terminal 17 preferably includes a wireless communication module 171 used at least for transmitting signals to the smartphone 300. Furthermore, the wireless communication module 171 is connected to the LAN cable 19 to enable the wireless communication module 171 to acquire driving data from the LAN cable 19 and to transmit the driving data to the smartphone 300.

The preferred wireless communication module 171 includes a long-distance transmission module 1711 and a short distance transmission module 1712. The long-distance transmission module 1711 is preferably selected from at least one of the group consisting of: a 3G module, a 4G module, and a 5G module. The short distance transmission module 1712 is preferably selected from at least one of the group consisting of: a Bluetooth communication module, a ZigBee communication module, a Wi-Fi communication module, an ultra-wideband (UWB) communication module, a radio frequency communication module, and infrared communication module. Provided the user's smartphone 300 has corresponding capabilities, the motorcycle 100 is capable of transmitting driving data to the smartphone 300 by either or both of the long-distance transmission module 1711 and the short distance transmission module 1712.

When the vehicle-mounted transmission terminal 17 transmits information to the smartphone 300 using the long-distance transmission module 1711, the transmission distance between the motorcycle 100 and the smartphone 300 can be substantial, and the convenience of information transmission is enhanced.

When the vehicle-mounted transmission terminal 17 transmits information to the smartphone 300 using the short distance transmission module 1712, the system reduces 3G/4G/5G usage (traffic charges) of long-distance transmission, which can reduce the operating cost of the motorcycle 100. Usage of the short distance transmission module 1712 can also increase data reliability/accuracy and reduce latency relative to usage of the long-distance transmission module 1711.

In the preferred embodiment, the long versus short distance connection method between the motorcycle 100 and the smartphone 300 is automatically switched based on the distance between the motorcycle 100 and the smartphone 300, typically by estimating the short-distance signal strength. When the motorcycle 100 and the smartphone 300 are determined to be within a preset distance (short-distance signal strength), signal transmission is carried out between the motorcycle 100 and the smartphone 300 by the short-distance transmission module 1712. When the smartphone 300 and the motorcycle 100 are determined to be outside the preset distance, the motorcycle 100 transmits driving data via the long-distance transmission module 1711, thereby avoiding information transmission interruption between the smartphone 300 and the motorcycle 100. The use of both connection methods enables the user to observe the current vehicle status of the motorcycle 100 in real time regardless of distance from the vehicle 100, improving the user experience. The preset distance is less than or equal to the maximum distance that the short distance transmission module 1712 can transmit and receive signals.

In some embodiments, the motorcycle 100 is capable of receiving remote commands sent by the smartphone 300 via the long-distance transmission module 1711. The motorcycle 100 responds to the received remote commands, thereby enabling the user to remotely control certain aspects of the motorcycle 100 beyond the preset distance. The remote commands which can be sent via the long-distance transmission module 1711 are selected from at least one of the group consisting of vehicle locking commands, vehicle unlocking commands, and anti-theft system engagement commands. The preferred embodiment enables vehicle locking commands, vehicle unlocking commands, and anti-theft system engagement commands to be transmitted either via the short-distance transmission module 1712 or the long-distance transmission module 1711.

In addition, the preferred motorcycle 100 includes a GPS module (not shown), and is further capable of responding to a vehicle search command sent by the smartphone 300. When the smartphone 300 sends the vehicle search command, the motorcycle 100 sends the current vehicle position to the smartphone 300, so that the smartphone 300 can display a search path based on the current vehicle position. The vehicle search command enhances the convenience of user searching for the vehicle 100 such as in instances where the user forgot where the motorcycle 100 was parked or the motorcycle 100 was towed or stolen.

Figure 5:
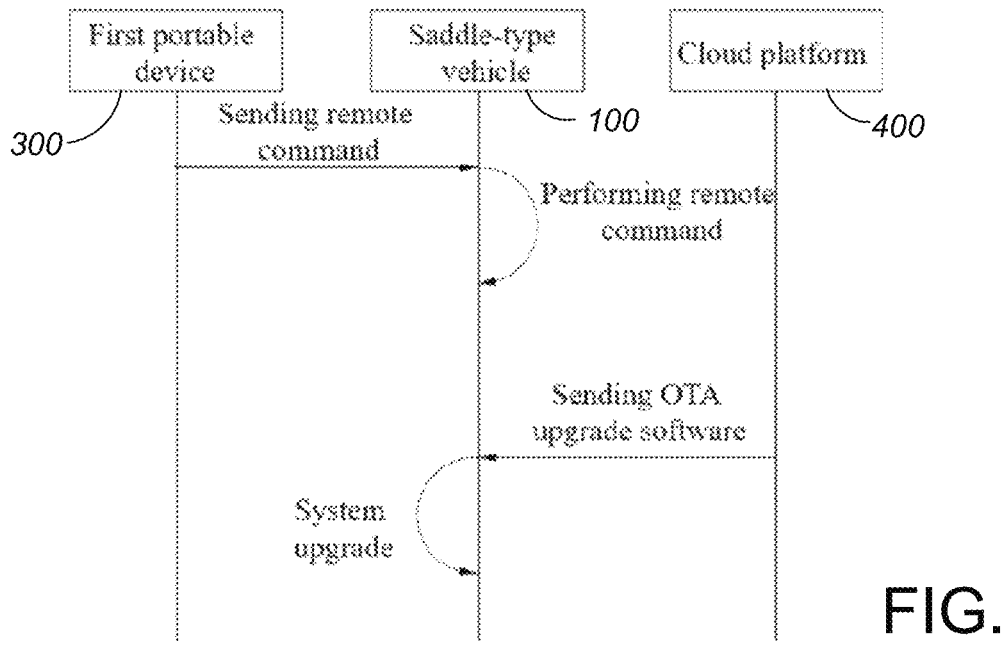
FIG. 5 shows a first timing diagram of the straddle-type vehicle based on an over-the-air ("OTA") upgrade in an embodiment of the present invention.

As shown in FIG. 4, when the wireless communication module 171 includes a long-distance transmission module 1711, the motorcycle 100 exchanges information with the user's smartphone 300 via a cloud platform 400 accessed by the long-distance transmission module 1711. The cloud platform 400 may be a single server, a cluster of multiple servers, or a cloud computing service center. FIG. 5 shows a further preferred aspect of using the cloud platform 400. Namely, the motorcycle 100 is preferably capable of receiving over-the-air ("OTA") upgrade software sent by the cloud platform 400. The motorcycle 100 is capable of performing system upgrades based on the received OTA upgrade software, thereby optimizing the user driving experience.

Figure 6:
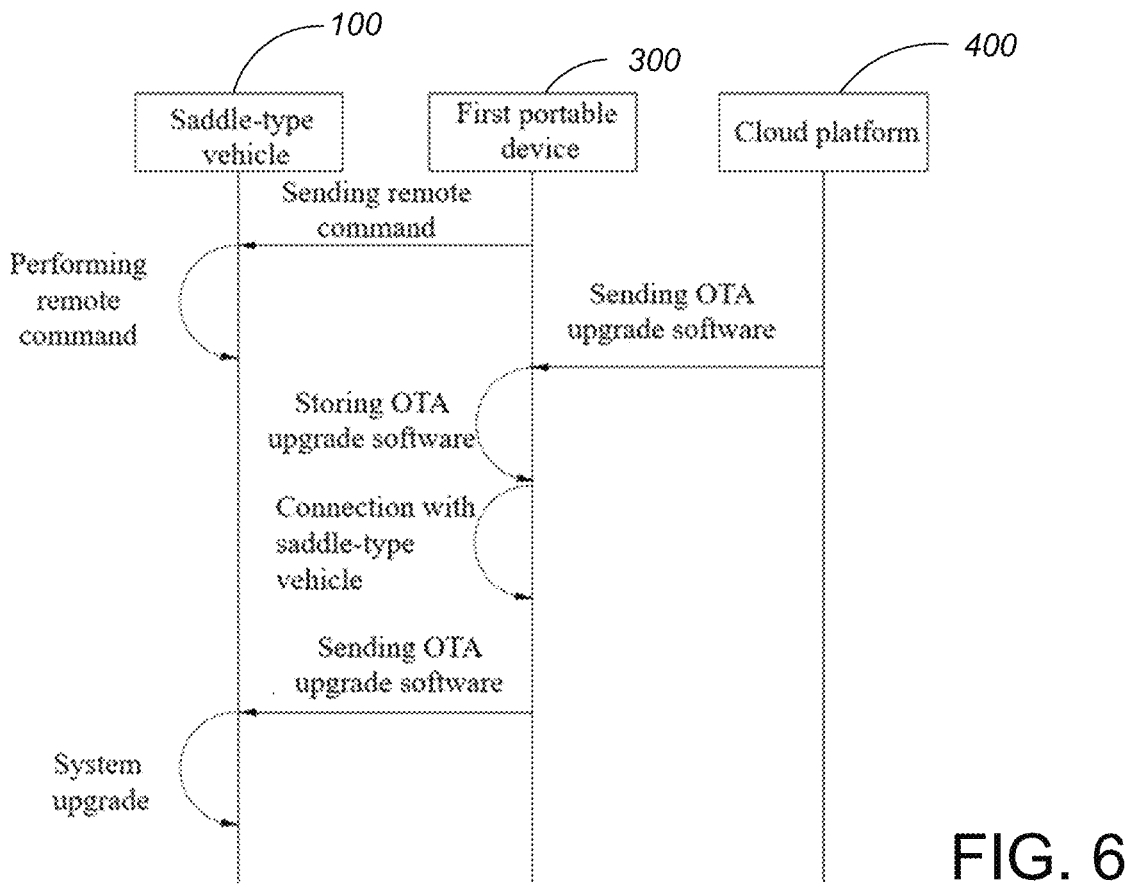
FIG. 6 shows a second timing diagram of the straddle-type vehicle based on an OTA upgrade in an embodiment of the present invention, which could be either in addition to or as an alternative to the timing diagram of FIG. 5.
Figure 7:
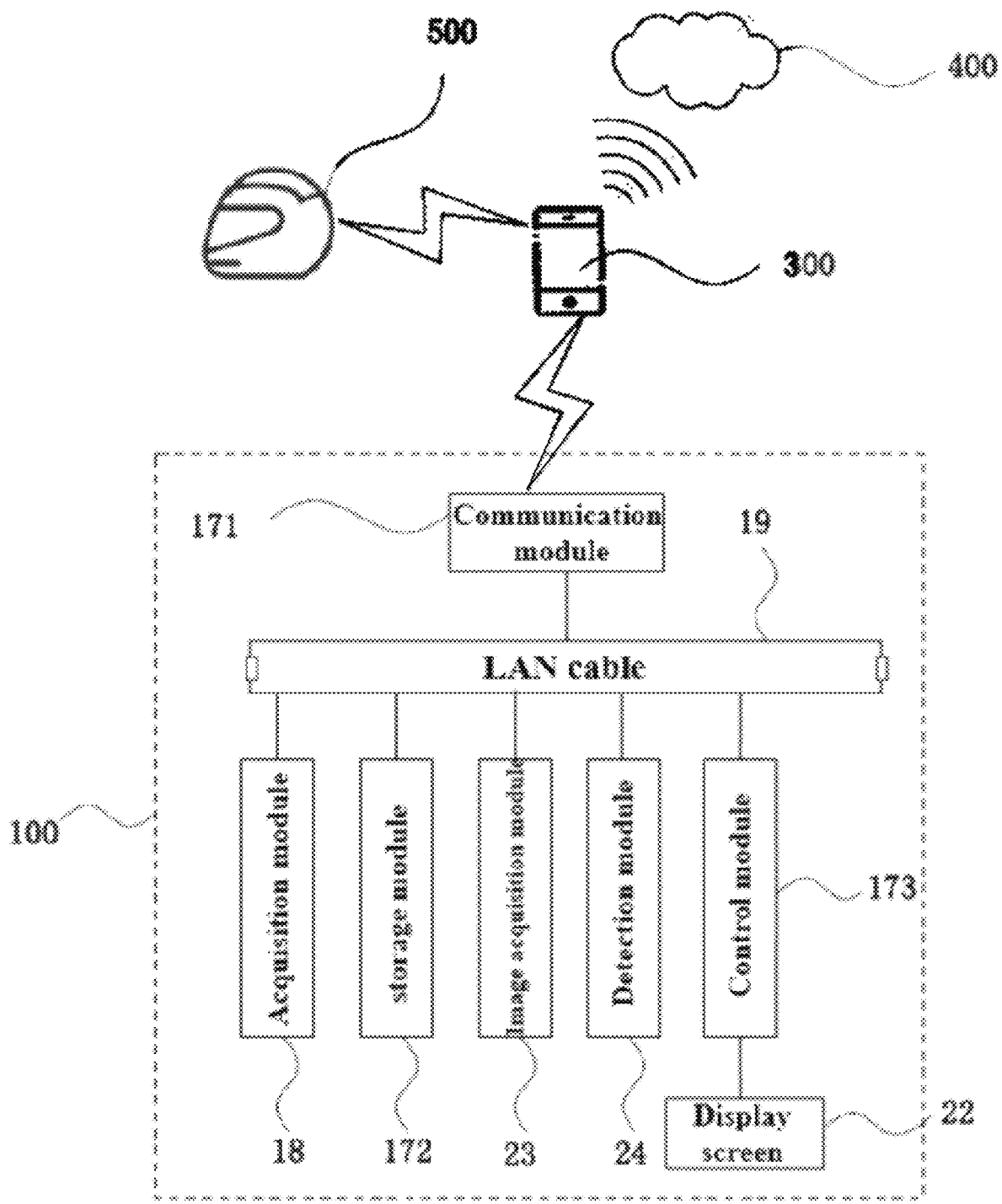
FIG. 7 is a block diagram of the straddle-type vehicle of FIGS. 1 and 2 showing additional modules of the preferred embodiment, showing communication links with the user's portable communications/display device and therethrough with a second portable device.

FIG. 6 shows an alternative or additional OTA software upgrade method using the short distance transmission module 1712. As an initial step, the smartphone 300 obtains the OTA upgrade software from the cloud platform 400, which may occur while the motorcycle 100 is disconnected from the smartphone 300, in which case the OTA upgrade software obtained from the cloud platform 400 is stored in the smartphone 300. For instance as shown in FIG. 7, the vehicle-mounted transmission terminal 17 further includes a storage module 172, which may be connected to the wireless communication module 171 directly or using the LAN cable 19. The storage module 172 includes a memory structure to store data, including but not limited to a Hard Disk Drive (HDD), a Floppy Disk Drive, a Solid State Drive (SSD), Flash Memory, an Optical Disk, a Magneto Optical Disk, Magnetic Tape or a Universal Serial Bus (USB) drive, or a combination thereof. The storage module 172 preferably includes removable or non-removable (or fixed) media, and the storage module 172 may be positioned inside or outside the vehicle-mounted transmission terminal 17. In some embodiments, the storage module 172 includes non-volatile memory. In some embodiments, the storage module 172 includes a Read Only Memory (ROM), which may be selected from Mask Programmed ROM, Programmable Read Only Memory (PROM), Erasable Programmable Read Only Memory (EPROM), Electrically Erasable Programmable Read Only Memory (EEPROM), Electrically Alterable Read Only Memory (EAROM), or Flash Memory (FLASH), or a combination thereof. In some embodiments, the storage module 172 includes a Random Access Memory (RAM) which may be Static Random-Access Memory (SRAM) or Dynamic Random Access Memory (DRAM), and the DRAM is selected from Fast Page Mode Dynamic Random Access Memory (FPMDRAM), Extended Date Out Dynamic Random Access Memory (EDODRAM), and Synchronous Dynamic Random-Access Memory (SDRAM). When the motorcycle 100 is re-connected to the smartphone 300, the motorcycle 100 is capable of obtaining the OTA upgrade software from the smartphone 300 via the short distance transmission module 1712 and then is capable of upgrading and optimizing based on the OTA upgrade software including storing the OTA upgrade software in the storage module 172.

Figure 10:
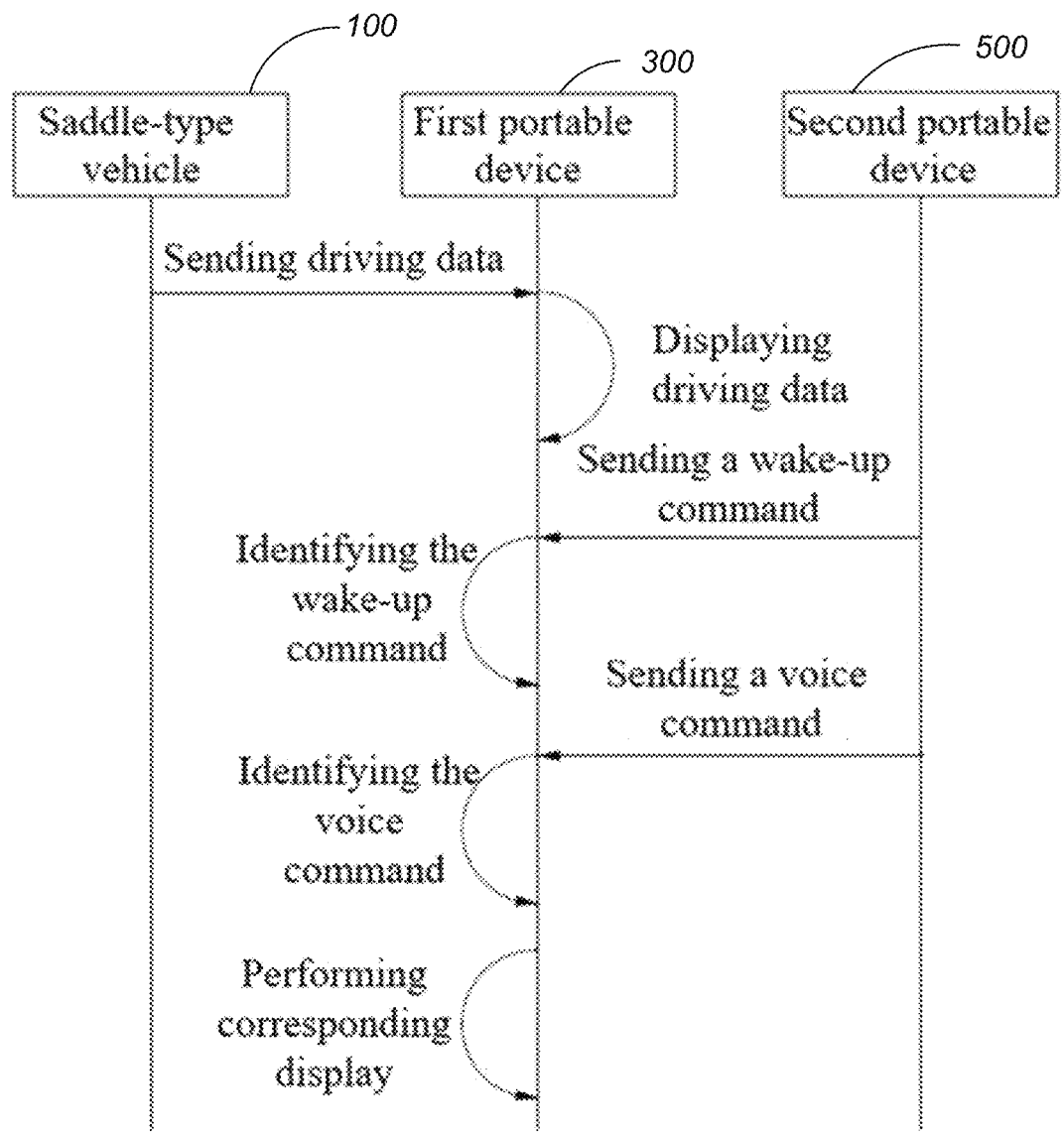
FIG. 10 is a timing diagram of the voice interaction of the straddle-type vehicle of FIG. 7.

In addition, the preferred motorcycle 100 allows driving data of the motorcycle 100 to be transmitted to the smartphone 300 by the short distance transmission module 1712 (driving data transmission shown only in the embodiment of FIG. 10). If desired, the driving data of the motorcycle 100 may be preliminarily stored in the storage module 172 prior to being transmitted to the smartphone 300. The smartphone 300 can thereafter upload the driving data of the motorcycle 100 to the cloud platform 400, which is capable of being analyzed on the cloud platform 400. For instance, the cloud platform 400 may be accessible on the Internet. While the preferred motorcycle 100 could access the cloud platform 400 directly using the long-distance transmission module 1711, using the short distance transmission module 1712 to upload the acquired driving data to the cloud platform 400 via the smartphone 300 for data analysis based on the driving data of the motorcycle 100 can reduce or eliminate the traffic charges of long-distance signal transmission for the motorcycle 100, thereby reducing the operating cost of the motorcycle 100 while still permitting cloud analysis of driving data.

It should be noted that in some cost-sensitive vehicles, the present invention allows the hardware and software requirements of the motorcycle 100 to be reduced. The storage module 172 can store driving data to ensure the integrity of driving data for the motorcycle 100. The signal transmission of driving data between the motorcycle 100 and the smartphone 300 is achieved by the combination of storage module 172 and short distance transmission module 1712, thereby reducing the long distance traffic charges of the motorcycle 100 during the signal transmission process and lowering the usage cost of the motorcycle 100.

In some embodiments, when the vehicle-mounted transmission terminal 17 transmits driving data to the smartphone 300, the smartphone 300 establishes a driving log based on the received driving data. The smartphone 300 is capable of storing the driving log locally, or the smartphone 300 is capable of transmitting the driving log to the cloud platform 400. The historical driving data of the motorcycle 100 is recorded, which can improve the maintenance efficiency of the motorcycle 100 and reduce the maintenance cost of the motorcycle 100.

Sending of the driving data of the motorcycle 100 to the smartphone 300 by the wireless communication module 171 also enables the smartphone 300 (properly running application software) to diagnose the motorcycle 100 in response to the driving data. The diagnostic content may include but is not limited to safety diagnosis of the motorcycle 100, such as detection and diagnosis of the braking performance, steering performance, and/or lighting performance of the motorcycle 100 and the like. The diagnostic content may further include a reliability diagnosis of the motorcycle 100, such as abnormal noise, wear, deformation, and the like. The diagnostic content may further include a power diagnosis of the motorcycle 100, such as acceleration ability, engine power, and power circuit performance, and the like. The diagnostic content may further include an environmental diagnosis, such as noise and exhaust emissions of the motorcycle 100. The smartphone 300 can have software enabling the smartphone 300 to display diagnostic information on the smartphone 300. In addition, the preferred application software for the smartphone 300 is further capable of reading diagnostic information of the motorcycle 100, which includes checking the vehicle fault code, the manufacturer of the vehicle controller, and driving data when a fault occurs. When a fault occurs in the motorcycle 100, the smartphone 300 can promptly alert the user, and thus the diagnostic information enables the user to make more accurate judgments on the fault cause in the motorcycle 100. The user can carry out subsequent maintenance, repair, and other operations, thereby ensuring that the motorcycle 100 operates in good condition and improving the safety performance of the vehicle.

Alternatively or additionally, the smartphone 300 can upload the driving data and diagnostic information to the cloud platform 400. The cloud platform 400 analyzes and processes the driving data and diagnostic information and stores them in the server of the cloud platform 400. The server of cloud platform 400 is capable of performing a deeper analysis and processing of driving data and storing driving data in cloud platform 400 for subsequent calls, thereby improving the efficiency of driving data utilization and the accuracy of diagnosing driving data.

In one embodiment, when the motorcycle 100 is started, the wireless communication module 171 sends a startup command to the application software of the smartphone 300. The smartphone 300 is capable of activating its display function of instrument images in response to the startup command sent by the wireless communication module 171. The smartphone 300 is thus capable of automatically displaying instrument images when the motorcycle 100 starts, thereby improving the user driving experience.

Additionally or alternatively, the user may move or press the hand control part 1511, causing the wireless communication module 171 of the motorcycle 100 to transmit a control command to the smartphone 300. The smartphone 300 is thereafter able to initiate the display function of the instrument image on its screen in response to the received control command.

The basic display screen 22 arranged on the front frame portion 111 of the vehicle body 11 as shown in FIG. 2 is preferably connected to the local area network cable 19 as shown in FIG. 7. In some embodiments, whenever the smartphone 300 is not displaying the instrument image, the basic display screen 22 is capable of easily displaying at least some instrument image converted from driving data. For instance, the instrument image displayed on the basic display screen 22 may be at least one of current vehicle speed and corresponding vehicle control information. When the motorcycle 100 is a fuel powered vehicle, the instrument image displayed on the basic display screen 22 may further include engine rotational speed and engine temperature. When the motorcycle 100 is an electric vehicle, the instrument image displayed on the basic display screen 22 may further include remaining battery level. However, the basic display screen 22 is a relatively low cost component, which does not have the full computing capabilities, the full data storage capabilities, or the full display capabilities of the user's smartphone 300.

As further shown in FIG. 7, the preferred vehicle-mounted transmission terminal 17 further includes a control module 173, which is electrically connected to the basic display screen 22 and is connected to the acquisition module 18 via the LAN cable 19. Whenever the smartphone 300 is not displaying the instrument image, in order to enable the user to obtain the current driving data of the motorcycle 100, the driving data acquired by the acquisition module 18 is processed by the control module 173, so that the driving data acquired by the acquisition module 18 is capable of being converted into the instrument image for the user to observe during the running process of the motorcycle 100. The control module 173 may be all or part a Vehicle Control Unit (VCU) or a Body Control Module (BCM), or alternatively may be independent of the VCU or BCM. The control module 173 is preferably only used for data processing of driving data, converting driving data into the instrument image, and displaying the instrument image on the basic display screen 22, and thus the control module 173 may be a less expensive component than in prior art motorcycles. In most existing straddle-type vehicles, in order to achieve display of complex functions on the display screen, a more expensive, complex control module needs to be used to optimize the processing ability and effectiveness of driving data. In the present invention, the basic display screen 22 is only used for simple display of an instrument image, thereby reducing the production cost of the motorcycle 100, and replacing at least some of the function of prior art display screens with the smartphone 300. The use of the smartphone 300 thereby optimizes the visual effect of the instrument image at minimal additional cost. The smoothness of user operation is improved by the smartphone 300, thereby enhancing the user driving experience.

In some embodiments, the smartphone 300 is capable of storing an application program for executing corresponding navigation functions. The preferred smartphone 300 when running the application program can simultaneously execute the navigation function, display navigation images and display driving data.

Figure 8:
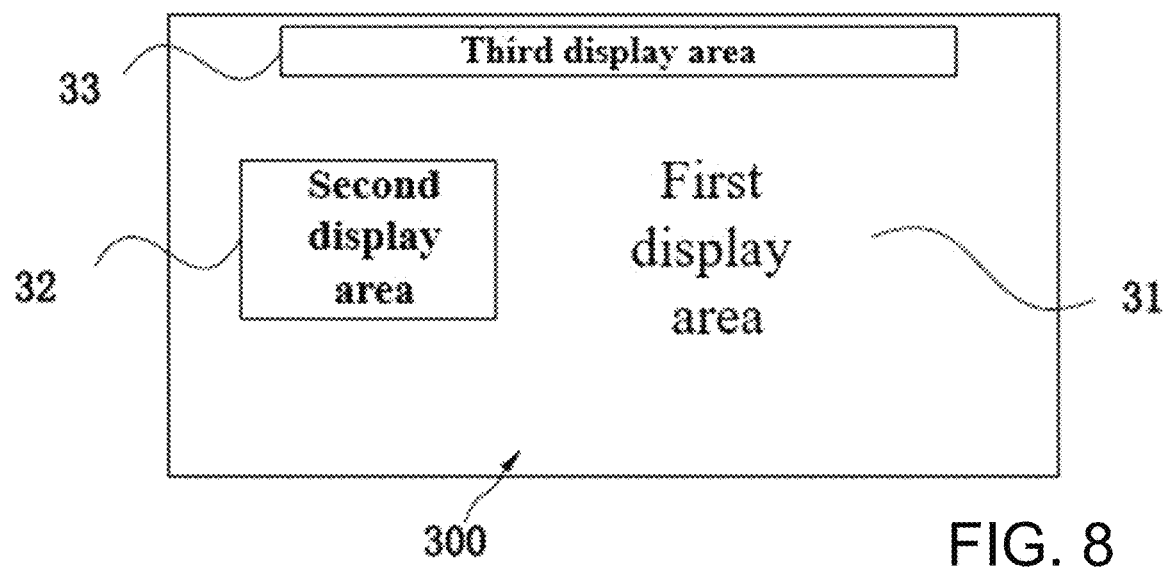
FIG. 8 is a schematic diagram of a screen of the user's portable communications/display device using the present invention.
Figure 9:
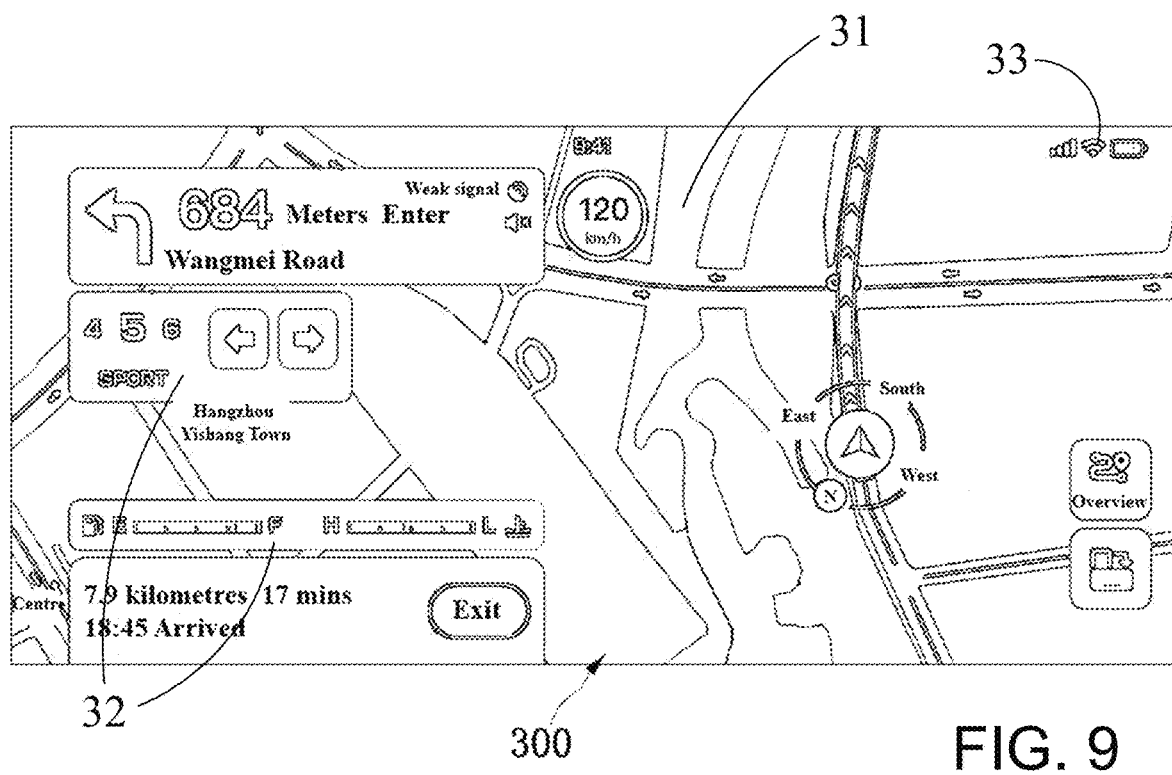
FIG. 9 shows an example screen of the user's portable communications/display device using the present embodiment.

FIGS. 8 and 9 show this aspect on the display of the smartphone 300. The screen of the smartphone 300 for performing navigation functions includes a first display area 31 and a second display area 32, with the first display area 31 being larger than the second display area 32. The first display area 31 is used to display navigation images. For instance, the first display area 31 can display the current position, current speed, time and distance of the vehicle 100 from the destination, and the like. The second display area 32 is used to display driving data. For instance, the second display area 32 can display the vehicle turn signal status, gear information, operating mode, and vehicle "endurance" information. When the power system 14 is an internal combustion engine, the vehicle endurance information refers to the remaining fuel level in the gas tank. When the power system 14 is an electric motor, the vehicle endurance information refers to the remaining battery capacity. When the power system 14 is hybrid, the vehicle endurance information may include both the remaining fuel and battery capacity. The preferred application program running on the smartphone 300 enables the user to simultaneously view navigation images and driving data of the motorcycle 100 without switching the display screen of the smartphone 300 while the motorcycle 100 is running. Therefore, the user driving experience is optimized while reducing the production cost of the motorcycle 100.

In addition, the screen of the smartphone 300 further includes a third display area 33, which is smaller than the second display area 32. The third display area 33 may be used to display self-information of the smartphone 300, such as current time, battery level, signal strength, and the like. The third display area 33 is preferably positioned at the top of the screen of the smartphone 300, which is conducive to improving the layout space utilization of the screen of the smartphone 300, and thus facilitating the display of the main information of the motorcycle 100.

In addition, the preferred application running on the smartphone 300 further includes an entertainment function image (not shown) and a voice call image (not shown). The user can send a control command to the smartphone 300 by the hand control part 1511 and/or the control pedal 21 to enable the smartphone 300 to switch between the instrument image, the navigation image, the entertainment function image, and the voice call image in response to the control command. During the running process of the motorcycle 100, the hand control part 1511 and/or the control pedal 21 can reduce user touch operations on the smartphone 300. Images on the screen of the smartphone 300 can be switched by operating the touch operations of the hand control part 1511 and/or the control pedal 21, thereby improving the safety of the motorcycle 100 during driving.

The preferred motorcycle 100 further includes an image acquisition module 23 shown in FIG. 7. The image acquisition module 23 includes at least one camera (not shown) used for obtaining environmental information around the motorcycle 100. The image acquisition module 23 is connected to the wireless communication module 171 via the LAN cable 19. The image acquisition module 23 is capable of transmitting the obtained environmental information to the wireless communication module 171 for display on the screen of the smartphone 300. The preferred smartphone 300 is capable of performing augmented reality ("AR") navigation based on environmental information. The AR navigation includes at least lane guidance, driving distance display, obstacle recognition, and the like. The ability to obtain environmental information of the motorcycle 100 during running is enhanced. Compared to flat navigation images, the content displayed in AR navigation is richer and closer to reality.

In the preferred embodiment, one camera (not shown) is at least partially oriented forward with respect to the motorcycle 100. During driving of the motorcycle 100, images received by the forwardly-oriented camara are capable of being transmitted to the smartphone 300 by the wireless communication module 171, and are capable of being stored locally on the smartphone 300 or uploaded to the cloud platform 400 by the smartphone 300. In the case of a crash of the motorcycle 100, storing camera images outside the motorcycle 100 helps ensure the completeness of the driving image data, thereby avoiding data loss and improving crash analysis.

In the preferred embodiment, one or a plurality of cameras (not shown) are at least partially oriented backward with respect to the motorcycle 100 for acquiring image information from the rear side of the motorcycle 100. For instance, the motorcycle 100 further includes two rear-view mirrors 25 positioned on the left and right sides of the vehicle body 11, with a camera mounted on each rear-view mirror 25. Alternatively or additionally, cameras may be positioned at the rear frame portion 112 of the vehicle body 11 and positioned on the left and right sides of the vehicle body 11, so as to avoid blocking of camera view by the user's limbs during driving.

The preferred motorcycle 100 has left and right turn signal lamps 26. When the user triggers the hand control part 1511 to turn on the turn signal lamps 26 of the motorcycle 100, the backwardly-oriented camera(s) starts to acquire image information from the rear of the motorcycle 100. The rearward image information is transmitted to the smartphone 300 by the wireless communication module 171, and the smartphone 300 displays the rearward image information on its screen. When the user triggers the hand control part 1511 to turn on the left turn signal lamp 26, the rearward-facing camera arranged on the left side of the motorcycle 100 starts and acquires image information, and the smartphone 300 displays the rearward-left image information. When the user triggers the hand control part 1511 to turn on the right turn signal lamp 26, the rearward facing camera arranged on the right side of the motorcycle 100 starts and acquires image information, and the smartphone 300 displays the rearward-right image information 100. The preferred application software for the smartphone includes a blind spot detection function, which improves driving safety.

Alternatively, in the event that the user triggers either of the left or right turn signal lamps 26, the rearwardly-facing cameras arranged at both sides of the motorcycle 100 can simultaneously start and acquire image information. The screen of the smartphone 300 displays rearwardly-facing image information on both sides of the motorcycle 100, so as to reduce the blind spots in the user's field of vision during driving.

The preferred motorcycle 100 further includes a detection module 24 as shown in FIG. 7. The detection module 24 is connected to the wireless communication module 171 via the LAN cable 19. The detection module 24 may be selected from at least one of the group consisting of: infrared radar, millimeter wave radar, and ultrasonic radar. The detection module 24 is mounted on the front frame portion 111 of the vehicle body 11, and a detection direction of the detection module 24 is oriented forward with respect to the motorcycle 100. Alternatively, the detection module 24 is mounted on the rear frame portion 112 of the vehicle body 11, and a detection direction of the detection module 24 is oriented rearwards with respect to the motorcycle 100.

During running, a current distance between obstacles and the front edge of the motorcycle 100 is detected by the detection module 24, or a current distance between obstacles and the rear edge of the motorcycle 100 is detected by the detection module 24. The detection module 24 uses the current distance as a detection signal and outputs a detection signal to the smartphone 300 by the wireless communication module 171. The smartphone 300 displays collision alert and/or warning information in response to the detection signal. For instance, the preferred smartphone 300 stores a preset distance threshold. If the current distance between the motorcycle 100 and an obstacle is less than or equal to the preset distance threshold, the smartphone 300 generates the warning information. The warning information includes at least one of a sound warning, a vibration warning, and an image warning.

In summary, AR navigation, blind spot detection, and collision detection of the motorcycle 100 are achieved by the image acquisition module 23 and detection module 24. The image acquisition module 23 and detection module 24 are only used to acquire environmental information around the motorcycle 100, and there is no need for the motorcycle 100 to include a processor for the environmental information. Instead, the image acquisition module 23 and detection module 24 both transmit environmental information to the smartphone 300 by the wireless communication module 171, and such data is processed by the smartphone 300 and/or the cloud platform 400 to achieve more accurate, less expensive, and more reliable data processing results.

In some embodiments, the detection module 24 is integrated with a controller (not separately shown in the FIGS.) for processing the detection signal. The motorcycle 100 is capable of transmitting the processed detection signal to the smartphone 300, which performs only the warning function.

Certain embodiments of the present invention further incorporate a second portable device 500 called out in FIGS. 7 and 10. The second portable device 500 is mainly an audio receiving device capable of receiving user voice commands and worn by the user, which may be but is not limited to at least one of a Bluetooth helmet or Bluetooth earphones. The smartphone 300 is capable of transmitting signals to the user-worn audio-receiving device 500.

When the voice interaction of the smartphone 300 is enabled, a voice command of the user is capable of being transmitted to the smartphone 300 by the user-worn audio-receiving device 500. The smartphone 300 is capable of being controlled to perform a corresponding display by the voice command. The convenience of the user operation of the smartphone 300 is improved, and the driving safety is enhanced during the running process.

In some embodiments, the smartphone 300 is capable of communicating with the cloud platform 400, and/or a semantic data module (not separately shown) is provided on the smartphone 300. When the voice command is transmitted to the smartphone 300, the smartphone 300 is capable of recognizing the voice command by the cloud platform 400 and/or semantic data module to enable the smartphone 300 to perform the corresponding display. The cloud platform 400 and/or semantic data module are equipped with semantic databases for recognizing voice commands. The preferred semantic database of the cloud platform 400 is an on-line database, whereas the semantic database of the semantic data module may be an on-line database and/or a local database. When the motorcycle 100 is located in an area with good signal, voice commands are capable of being recognized by the cloud platform 400 and/or semantic data module, thereby controlling the smartphone 300 to perform the corresponding display. When the motorcycle 100 is located in an area with poor signal, voice commands are capable of being recognized by the local database of the semantic data module to control the smartphone 300 to perform corresponding display, thereby meeting the voice control requirements of the motorcycle 100 in different situations and improving its voice control and human-machine interaction capabilities.

In some embodiments, the voice interaction function of the smartphone 300 includes a first wake-up method activated by voice and a second wake-up method activated by touch. The voice command includes a wake-up command. When the smartphone 300 receives the audio signal of a wake-up command from the user-worn audio-receiving device 500, the smartphone 300 compares the received audio with stored wake-up commands within the networked database and/or local database. If the wake-up command comparison is successful, the smartphone 300 will respond to the wake-up command and activate the voice interaction function. The smartphone 300 is further capable of recognizing audio signals sent by the user-worn audio-receiving device 500 of voice commands of the user other than the wake-up command, thereby achieving the possibility of voice operations.

In the second wake-up method, the hand control part 1511 and/or control pedal 21 sends a wake-up command to the smartphone 300 based on the corresponding touch operation, and the smartphone 300 responds to the wake-up command to activate voice interaction function. For instance, the wake-up command may be based on a press operation that lasts beyond a threshold length of time, such as for one second or more. A preferred press operation includes a first time length press and a second time length press, where the first time length press is less than the second time length press, such as a press for at least one second versus a press for at least three seconds. When the user presses the hand control part 1511 and/or control pedal 21 for the first time length press, the voice interaction function of the smartphone 300 is activated, thereby reducing the difficulty of operation and achieving relatively instant on/off of the voice interaction function. When the user presses the hand control part 1511 and/or control pedal 21 for the second time length press, the voice interaction function of the user-worn audio-receiving device 500 is activated. Both methods avoid starting based on an accidental touch of the hand control part 1511 by the user during the running of the motorcycle 100, which may otherwise cause the voice interaction to activate unintentionally.

In another embodiment, the press operation of the hand control part 1511 and/or control pedal 21 may be at least two consecutive presses to enable the voice interaction function of the smartphone 300. Using two or more presses helps to avoid starting of voice interaction based on an accidental touch of the hand control part 1511 by the user during the running of the motorcycle 100, thereby improving driving safety.

In comparison to some prior art structures, the present invention allows some complex data processing functions on the vehicle-mounted transmission terminal 17 of the motorcycle 100 to be removed. The preferred vehicle-mounted transmission terminal 17 need only perform simple data processing based on the driving data acquired by the acquisition module 18 and make a simple display on the basic display screen 22, so the software and hardware requirements for the motorcycle 100 are reduced, thereby lowering the production cost of the motorcycle 100. In the present invention, the motorcycle 100 replaces complex prior art display screens with the smartphone 300 to perform an instrument image display function. The data processing capability of the motorcycle 100 is improved by processing the driving data on the smartphone 300, and compared to the instrument image displayed on the basic display screen 22, the smartphone 300 has more comprehensive functions and richer visual effects, which reduces the cost of the motorcycle 100 and improves user driving experience.

In highly cost-sensitive vehicles, the long-distance transmission module 1711 can be fully omitted, so the motorcycle 100 relies entirely on the long-distance communication abilities of the smartphone 300 to interact with the cloud platform 400. Omitting the long-distance transmission module 1711 not only eliminates hardware costs of the motorcycle, but can eliminate traffic charges generated by the long-distance transmission module 1711, thereby reducing the operating cost of the motorcycle 100.

Numerous other minor modifications, embodiments and/or improvements can be devised by those skilled in the art which fall within the scope and spirit of the principles of this invention.

The invention claimed is:

1. A straddle-type vehicle comprising:
    a vehicle body where a portable communications/display device of a user of the straddle-type vehicle is detachably mounted, the vehicle body comprising a front frame portion and a rear frame portion, with a saddle area defined between the front frame portion and the rear frame portion;
    a suspension system connected to the vehicle body;
    a set of wheels connected to the vehicle body by the suspension system;
    a power assembly connected to the vehicle body to drive the set of wheels in a transmission mode;
    a steering assembly for controlling a driving direction of the straddle-type vehicle, the steering assembly connected to at least one of the wheels by the suspension system and comprising a steering handlebar;
    an anti-vibration bracket disposed on the front frame portion, the user's portable communications/display device being detachably mountable on the front frame portion by the anti-vibration bracket, wherein the anti-vibration bracket comprises a mounting member for mounting the user's portable communications/display device and a fixing member, one end of the fixing member being fixedly connected to the vehicle body, wherein the mounting member is connected to the fixing member by a rotating portion to enable the user's portable communications/display device to be hand-switched between a horizontal arrangement and a vertical arrangement by means of the rotating portion;

a vehicle-mounted transmission terminal capable of transmitting signals to the user's portable communications/display device;

at least one acquisition module capable of acquiring driving data of the straddle-type vehicle; and a local area network (LAN) cable, the vehicle-mounted transmission terminal being connected to the acquisition module by the local area network (LAN) cable;

wherein, during the running of the straddle-type vehicle, the vehicle-mounted transmission terminal is capable of transmitting the acquired driving data to the user's portable communications/display device, and the user's portable communications/display device is capable of converting the driving data into one or a plurality of instrument images for display on a screen of the user's portable communications/display device.

2. The straddle-type vehicle of claim 1, wherein the vehicle-mounted transmission terminal comprises a wireless communication module connected to the local area network (LAN) cable, the wireless communication module being capable of transmitting wireless signals to the user's portable communications/display device, and being capable of acquiring driving data from the LAN cable and wirelessly transmitting the driving data to the user's portable communications/display device, wherein the wireless communication module comprises a short distance transmission module and a long distance transmission module, and the straddle-type vehicle is capable of transmitting driving data to the user's portable communications/display device by both the short distance transmission module and the long distance transmission module.

3. The straddle-type vehicle of claim 2, wherein the straddle-type vehicle is capable of performing information interaction with a cloud platform via the long distance transmission module, and the straddle-type vehicle is capable of receiving over-the-air (OTA) upgrade software sent by the cloud platform via the long distance transmission module.

4. The straddle-type vehicle of claim 2, wherein the straddle-type vehicle is capable of receiving a remote command sent by the user's portable communications/display device via the long distance transmission module, the remote command being selected from at least one of the group consisting of a vehicle locking command, a vehicle unlocking command, and anti-theft system engagement command; and wherein the straddle-type vehicle is further capable of responding to the vehicle locking command, the vehicle unlocking command, or the anti-theft system engagement command sent by the user's portable communications/display device.

5. The straddle-type vehicle of claim 2, wherein the short distance transmission module is selected from the group consisting of: a Bluetooth communication module, a ZigBee communication module, a Wi-Fi communication module, an ultra-wideband (UWB) communication module, a radio frequency communication module, and an infrared communication module.

6. The straddle-type vehicle of claim 5, wherein the straddle-type vehicle is capable of performing information interaction with a cloud platform via the user's portable communications/display device, which is capable of receiving over-the-air (OTA) upgrade software sent by the cloud platform; when the vehicle-mounted transmission terminal is disconnected from the user's portable communications/display device, the user's portable communications/display device is capable of storing the OTA upgrade software; when the vehicle-mounted transmission terminal is re-connected to the user's portable communications/display device, the straddle-type vehicle is capable of obtaining the OTA upgrade software from the user's portable communications/display device via the short distance transmission module and is capable of upgrading based on the OTA upgrade software received.

7. The straddle-type vehicle of claim 5, wherein the vehicle-mounted transmission terminal further comprises a storage module electrically connected to the short distance transmission module, when the vehicle-mounted transmission terminal is disconnected from the user's portable communications/display device, the storage module is capable of storing driving data, and when the vehicle-mounted transmission terminal is re-connected to the user's portable communications/display device, the storage module is capable of transmitting the stored driving data to the user's portable communications/display device via the short distance transmission module.

8. The straddle-type vehicle of claim 2, wherein the steering handlebar is provided with a hand control part selected from at least one of the group consisting of: a button, a knob, and a toggle key; wherein the hand control part is electrically connected to the wireless communication module, and when the hand control part outputs a control command, the wireless communication module is capable of transmitting the control command to the user's portable communications/display device to control the user's portable communications/display device to perform a corresponding display change.

9. The straddle-type vehicle of claim 8, wherein the user's portable communications/display device is capable of executing navigation functions, and the driving data is capable of being displayed on one or a plurality of navigation images on the user's portable communications/display device.

10. The straddle-type vehicle of claim 9, wherein the control command outputted by the hand control part is capable of controlling the user's portable communications/display device to switch between one or more instrument images and the navigation images.

11. The straddle-type vehicle of claim 9, wherein a screen of the user's portable communications/display device comprises a first display area for displaying navigation images and a second display area for displaying the driving data, and an area occupied by the first display area is larger than an area occupied by the second display area.

12. The straddle-type vehicle of claim 8, wherein when the straddle-type vehicle is started, the wireless communication module sends a startup command to the user's portable communications/display device, and the user's portable communications/display device is capable of activating its display function of instrument images in response to the startup command sent by the wireless communication module.

13. The straddle-type vehicle of claim 2, further comprising a basic display screen connected to the LAN cable, and when the vehicle is running without the user's portable communications/display device being connected via the short distance transmission module, at least some driving data of the straddle-type vehicle is converted into instrument images displayed on the basic display screen.

14. The straddle-type vehicle of claim 1, further comprising an image acquisition module capable of acquiring environmental information around the straddle-type vehicle and capable of transmitting the environmental information to the vehicle-mounted transmission terminal, wherein the steering handlebar is provided with a hand control part selected from at least one of the group consisting of: a button, a knob, and a toggle key, wherein the vehicle-mounted transmission terminal is capable of transmitting the environmental information to the user's portable communications/display device when the hand control part sends a command to enable blind spot detection.

15. The straddle-type vehicle of claim 14, further comprising a plurality of rear-view mirrors arranged on left and right sides of the vehicle body, wherein image acquisition occurs on the rear-view mirrors.

16. The straddle-type vehicle of claim 1, further comprising a detection module selected from at least one of the group consisting of: infrared radar, millimeter wave radar, and ultrasonic radar, wherein the vehicle-mounted transmission terminal is used to send a detection signal of the detection module to the user's portable communications/display device to enable collision detection in response to the detection signal.

17. The straddle-type vehicle of claim 1, wherein when the straddle-type vehicle is running, a voice command of the user of the straddle-type vehicle received by a user-worn audio-receiving device is capable of being transmitted to the user's portable communications/display device, and the voice command is capable of controlling the user's portable communications/display device to enable corresponding display changes.

18. The straddle-type vehicle of claim 17, wherein the steering handlebar is provided with a hand control part selected from at least one of the group consisting of: a button, a knob, and a toggle key, wherein the hand control part is capable of sending a wake-up command to the user's portable communications/display device by one or a plurality of touch operations for awakening the voice interaction function.

19. The straddle-type vehicle of claim 1, wherein the driving data is selected from at least one of the group consisting of: current vehicle velocity, current vehicle gear, current vehicle temperature, and remaining fuel volume or remaining battery charge.

* * * * *